United States Patent
Burshtein et al.

[11] Patent Number: 5,994,953
[45] Date of Patent: Nov. 30, 1999

[54] APPARATUS AND METHOD FOR DETECTING DIGITAL FM

[75] Inventors: David Burshtein, Herzliya; Doron Rainish, Ramat Gan, both of Israel

[73] Assignee: D.S.P.C. Technologies Ltd., Givat Schmuel, Israel

[21] Appl. No.: 09/049,870

[22] Filed: Mar. 27, 1998

[30] Foreign Application Priority Data

Mar. 31, 1997 [IL] Israel ......................................... 120566

[51] Int. Cl.$^6$ .................................................. H04L 27/14
[52] U.S. Cl. .......................... 329/300; 329/315; 375/324; 375/334; 375/336
[58] Field of Search .................................... 329/300, 302, 329/303, 315; 375/324, 328, 334, 336, 340, 341, 342, 343

[56] References Cited

U.S. PATENT DOCUMENTS

| 4,322,851 | 3/1982 | Vance | 375/88 |
| 5,453,715 | 9/1995 | Lee | 329/302 |
| 5,469,112 | 11/1995 | Lee | 329/302 |

OTHER PUBLICATIONS

"Zero–Crossing Baseband Demodulator", E.K.B. Lee, 0–7803–3002–1/95 —IEEE 1995, pp. 466–470.

*Primary Examiner*—Siegfried H. Grimm
*Attorney, Agent, or Firm*—Skjerven, Morrill, MacPherson, Franklin & Friel LLP

[57] ABSTRACT

A symbol detector for frequency modulated (FM) symbols includes a section determiner, a direction of movement determiner and a data symbol determiner. The section determiner receives a sample of in-phase and quadrature signals associated with a baseband transmitted FM symbol and determines the section value of a unit circle in an in-phase—quadrature coordinate system in which the sample lies. The direction of movement determiner receives the section value of a current sample and the section value of a neighboring sample and generates a positive direction of movement value if the direction of movement along the unit circle from the neighboring sample to the current sample is counterclockwise, a negative direction of movement value if the direction of movement is clockwise and 0 otherwise. The data symbol determiner receives the direction of movement values and decodes the transmitted FM symbol by masking N direction of movement values.

10 Claims, 3 Drawing Sheets

APPARATUS AND METHOD FOR DETECTING DIGITAL FM

FIELD OF THE INVENTION

The present invention relates generally to detection of digital frequency modulated (FM) data symbols.

BACKGROUND OF THE INVENTION

Digital communication requires the transmission of data symbols. For frequency modulation (FM), each symbol defines a change in the frequency of the transmitted signal or, as indicated in FIG. 1 to which reference is now made, as a set of changes in the frequency.

FIG. 1 shows two Manchester encoded bits. When using FM, a "1" bit has the frequency of $f_0+\Delta f$ during the first T/2 seconds (from $t_0$ to $t_1$ of FIG. 1) of the bit and the frequency of $f_0-\Delta f$ during the second T/2 seconds (from $t_1$ to $t_2$) of the bit. A "0" bit has the opposite shape: during the first T/2 seconds (from $t_2$ to $t_3$) of the bit the frequency is $f_0-\Delta f$ and during the second T/2 seconds (from $t_3$ to $t_4$) of the bit the frequency is $f_0+\Delta f$. For advanced mobile phone service (AMPS) wideband data transmission, the bit duration T is 0.1 msec (i.e. bit rate is 10 KHz) and $\Delta f$ is 8 KHz.

Attempts have been made to decode the symbol values using the in-phase i(t) and quadrature q(t) components of the baseband version of the complex transmitted signal, where:

Equation 1

$$i(t)=A \cos (2\pi ft+\theta),$$

$$q(t)=A \sin (2\pi ft+\theta)$$

where f is the instantaneous frequency $+\Delta f$ or $-\Delta f$ of the baseband signal and $\theta$ is the instantaneous phase of the baseband signal.

FIG. 2, to which reference is now made, illustrates a unit circle 14 within an i-q coordinate system and the movement of the signal of FIG. 1 along circle 14. At the beginning ($t_0$), the signal of FIG. 1 has a first phase $\theta_0$, shown in FIG. 2 as somewhere within quadrant I.

When the frequency is $+\Delta f$, the signal moves counter clockwise along the circle 14 and when the frequency is $-\Delta f$, the signal moves clockwise along the circle 14. Thus, during the first portion of the 1 bit, the signal moves counter clockwise along the circle 14 until it reaches the position indicated by $t_1$. In this example, $t_1$ is in quadrant II. During the second portion of the 1 bit, the signal moves clockwise, arriving, at time $t_2$, to a position close, if not equal to, the position at time $t_0$. During the first portion of the 0 bit, the signal moves clockwise, moving to quadrant III by time $t_3$ and then, during the second portion of the 0 bit, the signal moves counter clockwise back to a position close, if not equal to, the position at time $t_2$.

U.S. Pat. No. 4,322,851 to Vance describes a decoder which utilizes the in-phase and quadrature information to decode binary FSK bits. U.S. Pat. No. 5,469,112 to Lee describes a decoder which also utilizes the in-phase and quadrature information but to decode multi-level FSK bits. Neither of U.S. Pat. No. 4,322,851 or U.S. Pat. No. 5,469,112 will successfully decode general FM modulated symbols (e.g. Manchester encoded bits) since both assume that each has a constant value.

SUMMARY OF THE PRESENT INVENTION

It is an object of the present invention to provide a decoding method and apparatus for decoding FM modulated symbols given in-phase and quadrature signals.

There is therefore provided, in accordance with a preferred embodiment of the present invention, a symbol detector for frequency modulated (FM) symbols which includes a section determiner, a direction of movement determiner and a data symbol determiner. The section determiner receives a sample of in-phase and quadrature signals associated with a baseband transmitted FM symbol and determines the section value of a unit circle in an in-phase-quadrature coordinate system in which the sample lies. The direction of movement determiner receives the section value of a current sample and the section value of a neighboring sample and generates a positive direction of movement value if the direction of movement along the unit circle from the neighboring sample to the current sample is counterclockwise, a negative direction of movement value if the direction of movement is clockwise and 0 otherwise. The data symbol determiner receives the direction of movement values and decodes the transmitted FM symbol by masking N direction of movement values.

Additionally, in accordance with a preferred embodiment of the present invention, the section determiner includes a plurality of comparators for generating at least the signs of the following data: the in-phase sample and the quadrature sample. Other information, such as the sum of the in-phase and quadrature samples and the difference of the in-phase and quadrature samples, can also be utilized.

Moreover, in accordance with a preferred embodiment of the present invention operative for Manchester bit decoding, the data symbol determiner includes a mask which adds together the direction of movement values associated with generally the first half of the data symbol and subtracts the direction of movement values associated with generally the second half of the data symbol.

The present invention incorporates the methods performed by the decoder and its elements.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 3:
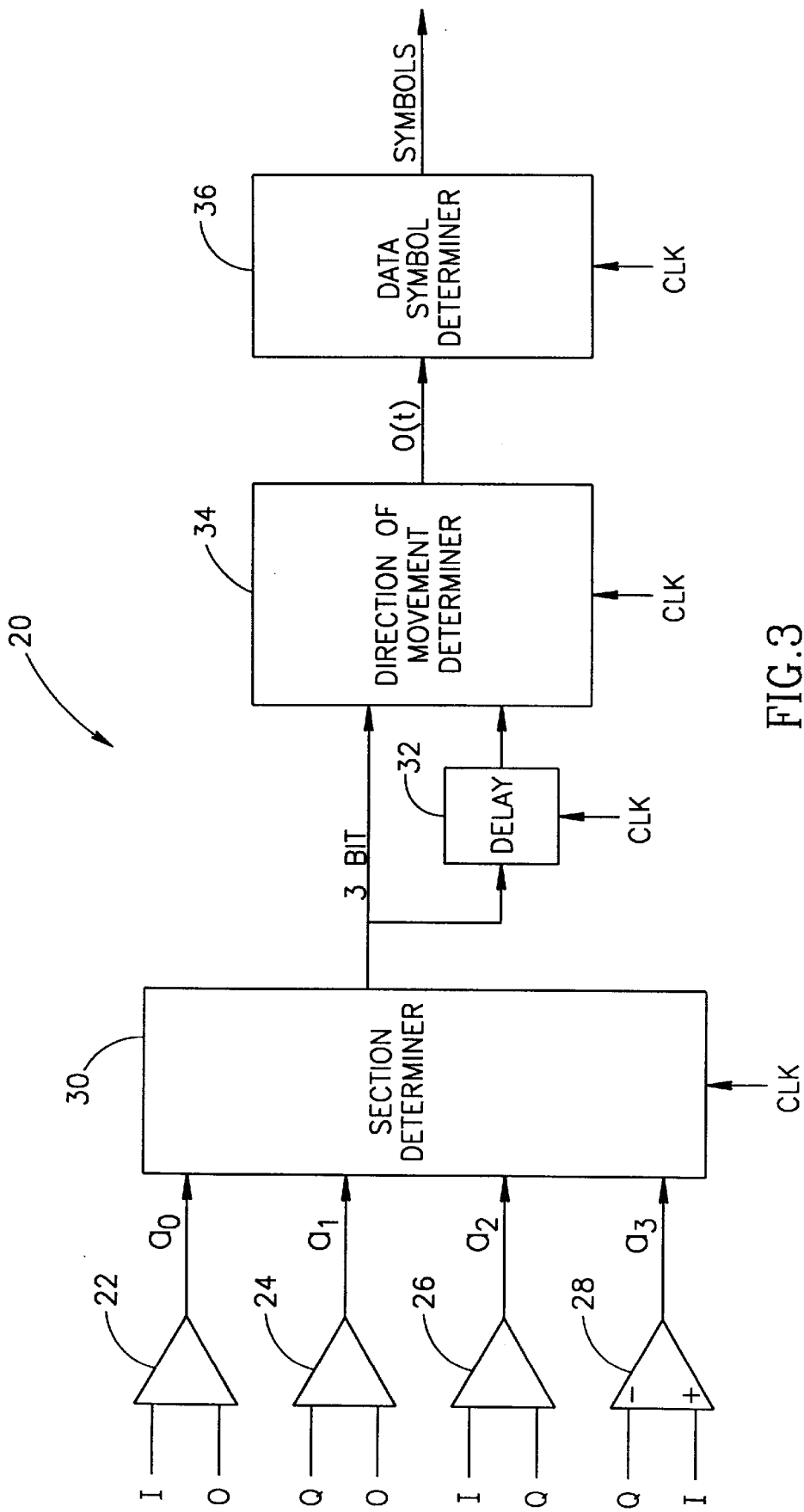
FIG. 3 is a block diagram of an FM symbol decoder, constructed and operative in accordance with a preferred embodiment of the present invention.
Figure 4:
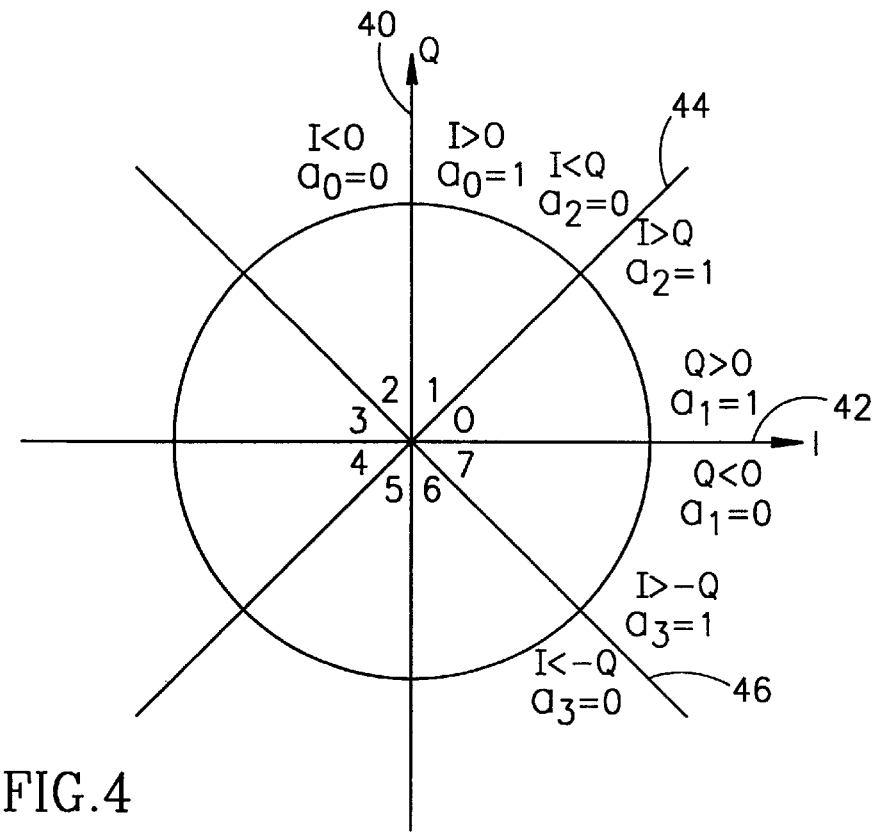
FIG. 4 is a graphical illustration of a decision tree for a section determiner forming part of FIG. 3.

Reference is now made to FIG. 3 which illustrates a frequency modulated (FM) symbol decoder 20, constructed and operative in accordance with a preferred embodiment of the present invention and to FIG. 4 which is useful in understanding the decoder 20.

The decoder 20 comprises a set of I/Q comparators 22, 24, 26 and 28, a section determiner 30 receiving the output of I/Q comparators 22–28, a delay unit 32 which delays the output of section determiner 30, a direction of movement determiner 34 which is connected to the output of section determiner 30 and delay unit 32 and a data symbol determiner 36 which operates on the output of direction of movement determiner 34.

I/Q comparators 22–28 receive sampled versions of the in-phase and quadrature signals i(t) and q(t) and compare the signals to each other and to 0, respectively producing the values $a_0$, $a_1$, $a_2$ and $a_3$. For example, I/Q comparator 22 determines if i(t) is positive (i.e. $a_0=1$) or negative (i.e. $a_0=0$), I/Q comparator 24 determines if q(t) is positive or negative (i.e. a, is $a_1$ is 1 or 0, respectively), I/Q comparator 26 determines if i(t) is larger or smaller than q(t) (i.e. $a_2$ is 1 or 0, respectively) and I/Q comparator 28 determines if i(t) is larger or smaller than –q(t) (i.e. $a_3$ is 1 or 0, respectively). Mathematically this is given by:

Equation 2

$$a_0 = \text{sign}(i(t))$$
$$a_1 = \text{sign}(q(t))$$
$$a_2 = \text{sign}(i(t) - q(t))$$
$$a_3 = \text{sign}(i(t) + q(t))$$

It will be appreciated that the values of the $a_i$ can be determined with analog comparators or through digital means. In the latter case, the i(t) and q(t) signals are digitized and the digital means operates in accordance with the mathematics provided in Equation 2. In both cases, a comparison operation is performed.

Figure 2:
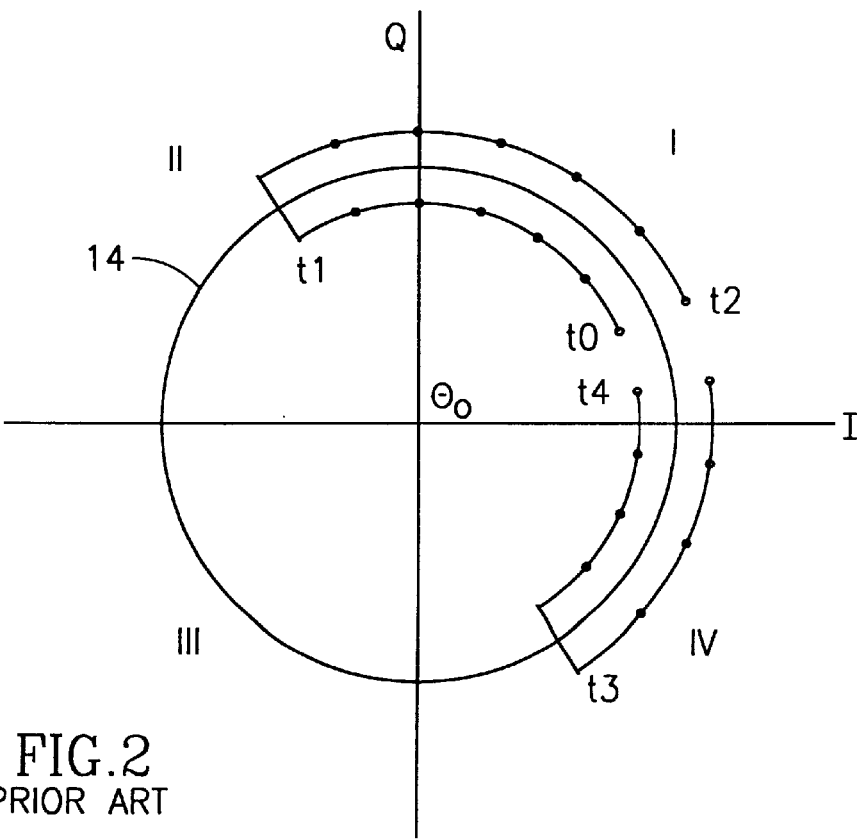
FIG. 2 is a graphical illustration of an i-q plane having a unit circle and the movement of the signal of FIG. 1 therein.

As shown in FIG. 4, $a_0$ defines the q axis 40 of the plane of FIG. 2. All points for which $a_0=1$ are to the right of the q axis and all points for which $a_0=0$ are to the left of or on the q axis. Similarly, $a_1$ defines the i axis 42 above which $a_1$ has a value of 1 and otherwise $a_1$ has a value of 0. The variable $a_2$ defines a diagonal axis 44 to the right of which $a_2$ has the value of 1 and the variable $a_3$ defines a further diagonal axis 46 to the right of which $a_3$ has a value of 1. The four axes 40–46 produce eight octants, labeled 0, 1, 2, 3, 4, 5, 6 and 7, within one of which the (i(t), q(t)) sample exists.

Section determiner 30 determines the octant 0–7 of the current sample, typically in accordance with a lookup table listing the combination of values for $a_0$, $a_1$, $a_2$ and $a_3$ for each octant. The output $\phi_q$ is a three bit octant value where $\phi_q \in \{0,1,2,3,4,5,6,7\}$. If $\phi_q=i$ then the phase θ of the current sample resides in the ith octant.

It will be appreciated that the present invention can be implemented with fewer or more than the eight sections shown hereinabove. For example, eight comparators could be used, dividing the unit circle into 16 sections. Section determiner 30 would then determine the section 0–15 in which (i(t),q(t)) sample lies. Minimally, only two comparators are required.

Figure 1:
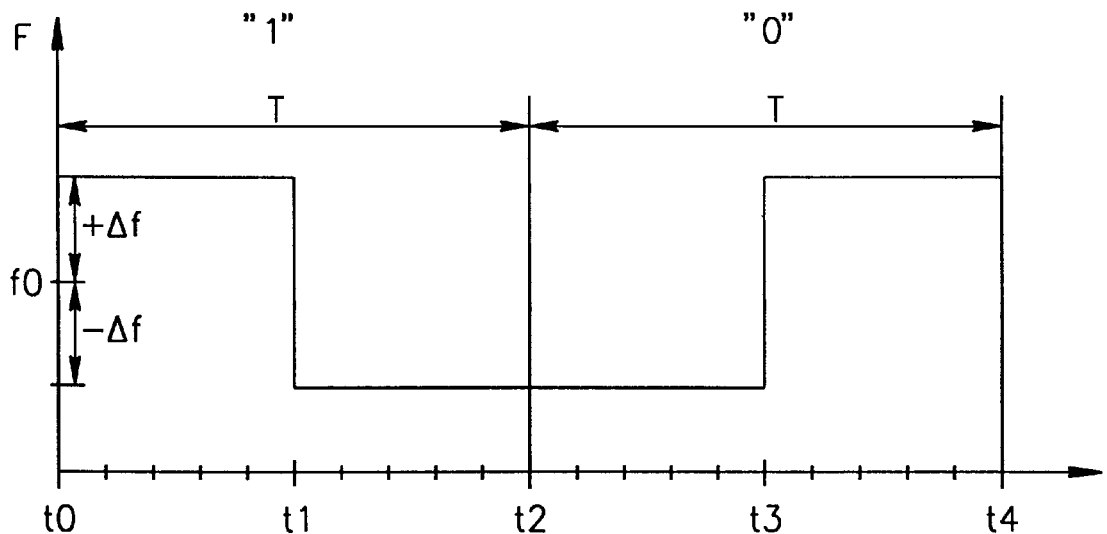
FIG. 1 is a graphical illustration of two Manchester encoded bits, where the first bit is a "1" and the second bit is a "0"
Figure 5:
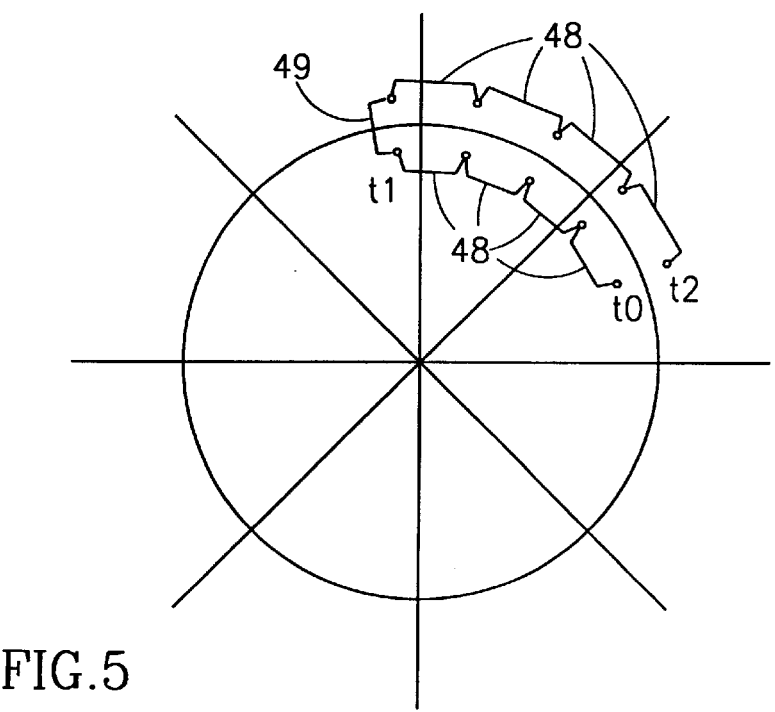
FIG. 5 is a graphical illustration of differential phase values useful in the decoder of FIG. 3.

Direction of movement determiner 34 initially determines a differential phase $\Delta\phi_q$ for each sample from the current and previous section values where, for the example given hereinabove, the differential phase $\Delta\phi_q$ is normalized to the range [−3,4]. FIG. 5, to which reference is now briefly made, illustrates the differential phases, labeled 48 and 49, for the "1" bit of FIG. 1. It is noted that the differential phase labeled 49 occurs as frequency of the bit changes.

Direction of movement determiner 34 defines the direction of movement indicated by the differential phase $\Delta\phi_q$, where the direction of movement is associated with the sign of the delta frequency $\Delta f$. As mentioned hereinabove with respect to FIG. 2, a counter clockwise phase difference indicates that the frequency is $+\Delta f$, i.e. positive, and a clockwise phase difference indicates that the frequency is $-\Delta f$, i.e. negative. For the example provided hereinabove, the direction of movement value O[t] is defined by:

$$O[t] = \begin{cases} +1 & \text{if } 4 > \Delta\phi_q > 0 \\ 0 & \text{if } \Delta\phi_q = 0 \text{ or } 4 \\ -1 & \text{if } -4 < \Delta\phi_q < 0 \end{cases}$$ Equation 3

In other words, if the current differential phase is either positive or negative, the direction of movement value O[t] is positive or negative, respectively. When the current differential phase is 0, there is no phase difference. Furthermore, if the current differential phase is 4 (indicating that the phase difference is 180°), it is not possible to determine the direction of the phase change. Therefore, the present invention produces a 0 value for this state also.

Direction of movement determiner 34 produces the direction of movement value O[t] for each consecutive pair of (i(t), q(t)) samples. Data symbol determiner 36 collects 9 output values of O[t] and, from them, determines if the symbol was a "1" or a "0" by performing a matched filter operation. For the example of Manchester bits described herein, the matched filter is:

$$MF = \sum_{j=0}^{8} b_j O[9-j]$$ Equation 4 where the mask $b_j$ of data symbol determiner 36 is defined as: $b_0, b_1, \ldots, b_8 = 1,1,1,1,0,-1,-1,-1,-1$. For Manchester bits, the mask of data symbol determiner 36 ignores the differential phase 49 (FIG. 5) at the change in frequency, sums the sign values of the first component of the bit and subtracts the sign values of the second component of the bit. A "1" bit is declared if MF is positive and a "0" bit is declared if MF is negative.

It will be appreciated that data symbol determiner 36 is relatively simple to implement since its input is a set of ternary values $\{1, 0, -1\}$ and its mask $b_j$ has the same ternary values.

It will be appreciated that other types of frequency modulation (such as Gaussian minimum shift keying (GMSK) modulation) can also be handled by the present invention. Only the data symbol determiner 36 needs to change as the shape of the mask must be matched to the structure of the symbols. For GMSK modulation which provide Gaussian shaped symbols, the mask should have a maximum in the middle of the symbol.

It will be appreciated by a persons skilled in the art that the present invention is not limited to what has been particularly shown and described hereinabove. Rather the scope of the present invention is defined only by the claims which follow:

We claim:

1. A symbol detector for frequency modulated (FM) symbols, the detector comprising:
   a. a section determiner which receives a sample of in-phase and quadrature signals associated with a baseband transmitted FM symbol and determines the section value of a unit circle in an in-phase—quadrature coordinate system in which said sample lies;
   b. a direction of movement determiner which receives the section value of a current sample and the section value of a neighboring sample and generates a positive direction of movement value if the direction of movement along said unit circle from said neighboring sample to said current sample is counterclockwise, a negative direction of movement value if the direction of movement is clockwise and 0 otherwise; and c. a data symbol determiner which receives said direction of movement values and decodes the transmitted FM symbol by masking N direction of movement values.

2. A detector according to claim 1 and wherein said section determiner includes a plurality of comparators for generating at least the signs of the following data: the in-phase sample and the quadrature sample.

3. A detector according to claim 2 and wherein said plurality of comparators additionally generate the signs of the following data: the sum of the in-phase and quadrature samples and the difference of the in-phase and quadrature samples.

4. A detector according to claim 1 and wherein said data symbol determiner includes a mask which adds together the direction of movement values associated with generally the first half of the data symbol and subtracts the direction of movement values associated with generally the second half of the data symbol.

5. A detector according to claim 1 and wherein said data symbol determiner includes a mask which has a maximum near the center of the symbol.

6. A method for detecting frequency modulated (FM) symbols, the method comprising the steps of:

a. receiving a sample of in-phase and quadrature signals associated with a transmitted FM symbol;

b. determining the section of a unit circle in an in-phase—quadrature coordinate system in which said sample lies;

c. generating a positive direction of movement value if the direction of movement along said unit circle from a neighboring sample to a current sample is counterclockwise, a negative direction of movement value if the direction of movement is clockwise and 0 otherwise; and d. decoding the transmitted FM symbol by masking N direction of movement values.

7. A method according to claim 6 and wherein said step of determining includes the steps of generating at least the signs of the following data: the in-phase sample and the quadrature sample.

8. A method according to claim 7 and wherein said steps of generating additionally include the steps of generating the signs of the following data: the sum of the in-phase and quadrature samples and the difference of the in-phase and quadrature samples.

9. A method according to claim 6 and wherein said step of decoding includes the steps of adding together the direction of movement values associated with generally the first half of the data symbol and subtracting the direction of movement values associated with generally the second half of the data symbol.

10. A method according to claim 6 and wherein said step of decoding includes the step of masking said direction of movement values with a mask which has a maximum near the center of the symbol.

* * * * *